Patented July 21, 1953

UNITED STATES PATENT OFFICE 2,646,415

COPOLYMERS OF POLYTHIOLS, PHENOLS, AND ALDEHYDES

Joseph C. Patrick, St. Petersburg, Fla., and Harry R. Ferguson, Trenton, N. J., assignors, by mesne assignments, to Reconstruction Finance Corporation, Washington, D. C., a corporation of the United States No Drawing. Application February 11, 1948, Serial No. 7,708

2 Claims. (Cl. 260—43)

This invention relates to resinous condensation products and also to varnishes, enamels, impregnating agents, adhesives, molding compounds, casting compositions and the like, made therefrom.

The art of phenolic resins, particularly resins made by the reaction of phenol with aldehydes has been extensively developed over a long period of time. The so-called one-stage resins are well known. In general such resins are made by reacting an aldehyde with a phenol, e. g. formaldehyde with ordinary phenol in the presence of an alkaline catalyst, e. g. ammonia or a caustic alkali. The reaction commonly occurs in the presence of water and the product may be dehydrated to any desired degree. Such resins are extensively used for various purposes, e. g., as coating compounds, adhesives and impregnants. In making the one-stage resins, the ratio of aldehyde to phenol is generally in the neighborhood of at least about 1 mol of aldehyde to 1 mol of phenol and some times a higher ratio, for example, the ratio of aldehyde to phenol may be from about 1.0 to 1.5.

There is also a class of phenol aldehyde condensation products made by what is commonly known as a two-stage process in which a molecular excess of phenol in relation to the aldehyde is maintained during the first stage frequently under acid conditions. The result is a fusible soluble resin. This may readily be converted to an infusible insoluble form by supplying a sufficient proportion of aldehyde and preferably changing the condition from acid to alkaline. Hexamethylenetetramine performs both of the latter functions, i. e. it supplies the additional proportion of aldehyde and also alkaline conditions.

Phenolic resins, while possessing many valuable properties and finding extensive commercial use, nevertheless suffer from many well known disadvantages. The disadvantages may be illustrated by reference to a typical phenol aldehyde condensation product dissolved in a solvent, for example, a mixture of alcohol and toluene. When such a composition is used as a baking varnish for example, on a metallic surface, it frequently develops cracks when the surface is distorted. A test commonly employed to determine such characteristics involves coating a test strip of metal with a phenolic resin varnish then carrying the resin to the infusible stage by evaporating the solvent and baking the resulting film. The coated strip is then bent around a conical mandrel and the result is then inspected. In general, phenol aldehyde resins of the character mentioned do not respond satisfactorily to that test because they develop cracks and also peeled-off portions thus manifesting a lock of sufficient adhesiveness, flexibility and toughness.

Many attempts have been made over a long period of time to overcome the inherent brittleness of aldehyde phenol resins, in particular, resins made from ordinary phenols and the cresols and formaldehyde.

At least a great many of those attempts have been unsuccessful because they employed the principle of using plasticizers which while perhaps compatible with the phenolic resins in the A or B stage became incompatible with such resins when carried to the C or infusible stage and such infusible stage usually has to be developed in order to bring out the best properties of the phenolic resins.

In contradistinction to such methods and principles, in accordance with the present invention a class of substances is used the members of which may be chemically reacted either with an aldehyde and a phenol or with a phenol-aldehyde condensation product before it has reached the infusible or C stage i. e. a phenol aldehyde condensation product existing in the A or B stage. That class of substances is identified as the polythiols and the polythiols of the present invention have the general formula $(RS_q)_p H_{(q-2)p+2}$ where R is a radical of the group consisting of

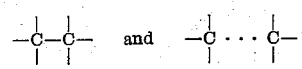

representing respectively adjacent carbon atoms and carbon atoms joined to and separated by intervening structure, S is a sulfur atom and $q$ is one of the integers 2, 3 or 4, each of said sulfur atoms being connected to a different carbon atom of said radical and $p$ is a number varying from 1 to 300.

Numerous illustrations of different species of said class of polythiols will be given below. As above mentioned, a polythiol or a mixture of two or more polythiols may be reacted with a phenol and an aldehyde or with a resinous condensation product previously made by reacting a phenol and an aldehyde to obtain a phenol aldehyde condensation product which has been reacted to the A or B stage but preferably not to the C stage, i. e. preferably not as far as the stage of complete fusibility and insolubility. In carrying out the reaction a catalyst is desirable although the use of a catalyst is not a sine qua non and where such catalyst is used it may be of the same kind commonly employed in phenol condensations, e. g., ammonia and the fixed alkalies and the numerous acids and acid salts which have been employed in phenol aldehyde condensation. The proportion of polythiol may vary over very wide limits e. g. from 5% to 70% by weight of the sum total of the phenol, aldehyde and polythiol. Within that range it has been found that 10 to 40% by weight of polythiol is a desirable range and has effected a marked increase in adhesiveness, toughness and flexibility. The temperature of the reaction may also vary over wide limits. If given sufficient time it will occur at temperatures as low as 20° to 25° C. The reaction time is reduced, that is, the reaction rate is increased as the temperature increases in accordance with common chemical experience and generally the maximum temperature is in the neighborhood of 100° C. although if desired the temperature can be carried higher, e. g. to 150° C.

Aldehydes in general may be employed e. g. formaldehyde and its homologues, e. g. acetaldehyde, propionaldehyde, butyraldehyde, acrolein, methacrolein, crotonaldehyde, furfural, etc. Phenols in general may also be employed. However, the preferred species among the aldehydes and the preferred species among the phenols are respectively formaldehyde and ordinary phenol and the cresols.

The following tables illustrate a considerable number of polythiols, i. e., polymercaptans which may be employed:

TABLE I $H(S-CH_2CH_2-S)_pH$ $H(S-CH_2CH_2CH_2-S)_pH$ $H(S-(CH_2)_5-S)_pH$ $H(S-CH_2CH_2OCH_2CH_2-S)_pH$ $H(S-CH_2CH_2OCH_2OCH_2CH_2-S)_pH$ $H(S-CH_2CH_2OCH_2OCH_2CH_2S)_pH$ $H(S-CH_2CH_2SCH_2CH_2-S)_pH$ $H(S-CH_2CHOHCH_2-S)_pH$ $H(S-CH_2-CH-S)_pH$
           $|$
           $CH_3$

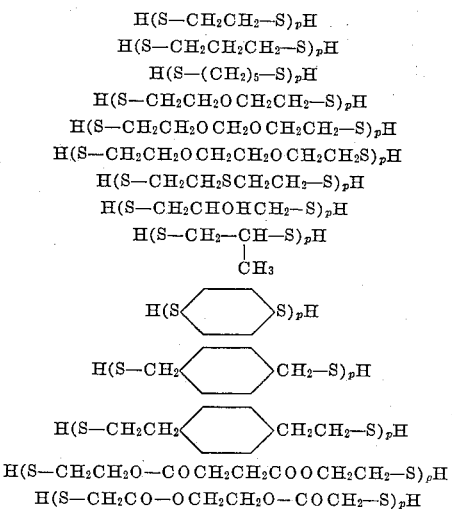

$H(S-CH_2CH_2O-COCH_2CH_2COOCH_2CH_2-S)_pH$ $H(S-CH_2CO-OCH_2CH_2O-COCH_2-S)_pH$

TABLE II $HS-CH_2-CHCH_2-SH$
        $|$
        $SH$ $HS-CH_2CO-OCH_2CHCH_2O-COCH_2-SH$
                $|$
                $OCOCH_2-SH$ $\phantom{HS-}CH_3 \phantom{CO-OCH_2CHCH_2O-CO} CH_3$
$\phantom{HS-}|\phantom{CO-OCH_2CHCH_2O-CO}|$
$HS-CHCO-OCH_2CHCH_2O-COCH-SH$
                $|$
                $OCOCH-SH$
                $|$
                $CH_3$ $\phantom{HS-CH_2CH_2O-COCH_2}OH$
$\phantom{HS-CH_2CH_2O-COCH_2}|$
$HS-CH_2CH_2O-COCH_2CCH_2CO-OCH_2CH_2-SH$
$\phantom{HS-CH_2CH_2O-COCH_2CCH_2C}|$
$\phantom{HS-CH_2CH_2O-COCH_2CCH_2}CO-OCH_2CH_2-SH$ $\phantom{HOCH_2C-}CH_2O-COCH_2-SH$
$\phantom{HOCH_2C-}|$
$HOCH_2C-CH_2O-COCH_2-SH$
$\phantom{HOCH_2C-}|$
$\phantom{HOCH_2C-}CH_2O-COCH_2-SH$ $HS-CH_2CHCO-OCH_2CH_2-SH$
        $|$
        $SH$ $HS-CH_2CHCO-OCH_2CH_2OCH_2CH_2-SH$
        $|$
        $SH$ $HSCH_2CHCH_2O-COCH_2CH_2CH_2CHCH_3$
        $|$ $\phantom{-COCH_2CH_2CH_2C}|$
        $SH$ $\phantom{-COCH_2CH_2CH_2C}SH$ $HSCH_2CHCH_2OCH_2CH_2-SH$
        $|$
        $SH$ $HSCH_2CHCH_2OCH_2OCH_2CH_2-SH$
        $|$
        $SH$

TABLE III $\phantom{HS-CH_2C}CH_2-SH$
$\phantom{HS-CH_2C}|$
$HS-CH_2CCH_2-SH$
$\phantom{HS-CH_2C}|$
$\phantom{HS-CH_2C}CH_2-SH$ $HS-CH_2CHCH_2OCH_2CHCH_2-SH$
        $|$ $\phantom{CH_2OCH_2C}|$
        $SH$ $\phantom{CH_2OCH_2C}SH$ $HS-CH_2CHCH_2OCH_2OCH_2CHCH_2-SH$
        $|$ $\phantom{CH_2OCH_2OCH_2C}|$
        $SH$ $\phantom{CH_2OCH_2OCH_2C}SH$ $\phantom{HS-CH_2CO-O}CH_2O-COCH_2-SH$
$\phantom{HS-CH_2CO-O}|$
$HS-CH_2CO-OCH_2CCH_2O-COCH_2-SH$
$\phantom{HS-CH_2CO-O}|$
$\phantom{HS-CH_2CO-O}CH_2O-COCH_2-SH$ $HS-CH_2CHCH_2O-COCH_2CH_2CH_2CH_2CO-OCH_2CHCH_2-SH$
        $|$ $\phantom{CH_2O-COCH_2CH_2CH_2CH_2CO-OCH_2C}|$
        $SH$ $\phantom{CH_2O-COCH_2CH_2CH_2CH_2CO-OCH_2C}SH$ $HS-CH_2CHCH_2SCH_2CHCH_2-SH$
        $|$ $\phantom{SCH_2C}|$
        $SH$ $\phantom{SCH_2C}SH$ $HS-CH_2CHCOOCH_2CH_2O-COCHCH_2SH$
        $|$ $\phantom{COOCH_2CH_2O-CO}|$
        $SH$ $\phantom{COOCH_2CH_2O-CO}SH$ $\phantom{HS-CHCO-OCH_2C}CH_3$
$\phantom{HS-CHCO-OCH_2C}|$
$\phantom{HS-CHCO-OCH_2}CHO-COCH-SH$
$HS-CHCO-OCH_2CCH_2O-COCH-SH$
$|\phantom{HCO-OCH_2C}|\phantom{H_2O-COCH-S}|$
$CH_3\phantom{CO-OCH_2C}|\phantom{H_2O-COCH-}CH_3$
$\phantom{HS-CHCO-OCH_2}CHO-COCH-SH$
$\phantom{HS-CHCO-OCH_2C}|$
$\phantom{HS-CHCO-OCH_2C}CH_3$ $HS-CH_2CHCOOCH_2-CH-CH_2-SH$
        $|$ $\phantom{COOCH_2-C}|$
        $SH$ $\phantom{COOCH_2-C}SH$ In Table I above $p$ varies from 1 to 300.

In addition to the monomeric polymercapto compounds shown in the above Tables II and III, polymeric products of said compounds may be used, all of said products and compounds having the general formula $(RS_q)_pH_{(q-2)p+2}$ where $q$ is one of the integers 3 and 4 and $p$ varies from 1 to 300 and R has the definition given above.

The monomeric polymercaptans shown in Tables I, II and III can be readily prepared from the corresponding halides by the standard methods of organic synthesis, for example, treatment of the halide with thiourea, potassium ethyl xanthate or sodium hydrosulfide. The polymeric polymercaptans can be prepared by a number of methods. One of those methods is the partial and controlled oxidation of the monomeric polythiols. Another and preferable method of making the polymeric polythiols consists in first making a polysulfide polymer having a degree of polymerization (dP) higher than the degree of polymerization of the desired polymeric polythiols and then effecting a controlled splitting to produce the desired dP. Such preferred method is shown in Examples 1 and 2 submitted below. Example 3 sets forth a conventional method of making a one-stage phenol formaldehyde condensation product in order that the improved properties of products of the present invention may be contrasted with the properties of a resin made by said conventional method. Examples 4 to 10 inclusive illustrate purely for purposes of illustration processes and products embodying the present invention.

The principles of the invention will be defined in the claims and it will be understood that those principles are illustrated by but not limited to the specific Examples 4 to 10 submitted herewith and that numerous amplifications thereof may be made within the scope and principles of said claims.

Example 1

To 8.4 gram mols of sodium disulfide employed in the form of a 2 molar sodium disulfide solution there are added 48 grams of MgCl₂, haxahydrate and 15 grams of sodium hydroxide. Using vigorous agitation the mixture is heated to 185° F. and there is added 8 gram mols of bis (2-chloroethyl) formal over a period of 1 hour. During the halide feed the heat of reaction is used to carry the temperature up to 210° F. At the end of the halide feed the reaction mixture is held for 60 minutes at 212° F. The latex is washed free of soluble salts by intermittent decantation with water. A second treatment which comprises heating the latex in the presence of 2 gram mols of sodium disulfide in the form of a 2 molar solution of that salt for 30 minutes at 185° F. is used to increase the toughness of the polymer. The latex is again washed to remove the soluble salts. The molecular weight of the polymer at this point is high, that is of the order of 100,000 to 200,000. The high polymer is then converted to low molecular weight dithiols by treatment of the latex with 0.8 mols of sodium hydrosulfide and 4.4 g. mols of sodium sulfite. The latex is heated with agitation in the presence of these splitting salts 60 minutes at 180° F. The latex is then washed again free of soluble materials. The resulting product is coagulated by the addition of an amount of acid which will produce a hydrogen ion concentration corresponding to a pH of 3 to 5 and then washed free from soluble salts. The molecular weight of the products resulting from the above treatment is found to vary from 4000 to 5000 determined cryoscopically by solution in benzene.

Example 2

Proceed as in Example 1 up to the point of addition of the splitting salts.

In the instant example the splitting process is carried out by the addition to the washed latex of 1.6 gram mols of sodium hydrosulfide and 4.4 gram mols of anhydrous sodium sulfite. The latex is then heated in the presence of these salts for 1 hour at 180° F. The split latex is then acidified with acetic acid to a pH of 3 to 5, after which the semi-liquid reaction product is washed by decantation until substantially free from soluble salts. The product obtained is similar to that of Example 1 except that molecular weight is approximately 1200.

The two methods cited above serve to illustrate the method of preparing dithiols of controlled molecular weight for the purpose of this invention.

Instead of the dichlorodiethyl formal used in Examples 1 and 2 organic dihalides in general may be substituted in equivalent molar proportions, such organic dihalides having a halogen atom attached to each of two different carbon atoms and having the general formula XRX where R is a bivalent radical having skeleton carbon structure

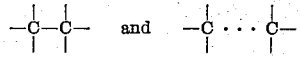

representing adjacent carbon atoms and carbon atoms joined to and separated by intervening structure, respectively, and X is a halogen atom. Numerous examples of such organic dihalides may be seen by reference to Patrick, U. S. Patents 2,216,044, September 24, 1940, and 2,363,614, November 28, 1944.

Example 3

In a resin flask or three-necked flask equipped with stirrer, reflux condenser and thermometer, place 2 mols of phenol (188 grams) and 2.2 mols of formaldehyde (174 grams of 38% formalin). Using agitation add 15 grams of 28% ammonium hydroxide solution. Heat the reaction to the reflux temperature and hold for 40 minutes. Dehydrate the resin by heating with stirring under a pressure of about 15–30 mm. of mercury.

Example 4

Proceed exactly as in Example 3 but add 50 grams of the dithiol prepared as in Example 1 before addition of the ammonium hydroxide.

Example 5

Proceed exactly as in Example 3 but add 50 grams of dithiol prepared as in Example 2.

The products prepared as in Examples 4 and 5 show an appearance quite similar to the control phenolic resin as prepared in Example 3. However, if one prepares films by dipping steel panels into a solvent solution of the control and a solvent solution of the modified resins and then bakes for 30 minutes at 150° C. the dithiol modified resin films will be found to have a much increased degree of flexibility and adhesion when subjected to bending by a conical mandrel test. The chemical and water resistance of the modified resins are just as good as the control.

This type of dithiol modification is not limited to the above type of reaction but can be used in all the different possible methods of preparation of phenol formaldehyde resin.

Example 6

In a resin flask equipped as above place 1 mol of phenol, 1.5 mols of formaldehyde, in the form of 38% formalin solution, 1.0 gram of sodium hydroxide and 9.6 grams of bis (2-mercapto ethyl) formal HSCH₂CH₂OCH₂OCH₂CH₂SH. Heat 13 hours at 50° C. A clear aqueous resin solution results containing about 50% solids which can be diluted to about 25% total solids with water before any precipitation occurs.

Example 7

Proceed as in Example 6 but use 19.2 grams of the same dimercaptan. The resulting aqueous resin solution can be diluted to 35% total solids in water before any precipitation occurs.

Example 8

Using the same equipment as in others, put together 1 mol of p-ter-butyl phenol, 2 mols of formaldehyde, in the form of 38% formalin solution, 2.0 grams of sodium hydroxide dissolved in 10.0 grams of water, and 23.4 grams of the polythiol made according to Example 2. Heat the materials to reflux and hold there for 2 hours. After cooling to room temperature, neutralize the mixture with 5% acetic acid solution and wash thoroughly with water by decantation. Dehydrate at 15 to 30 mm. pressure with heating.

Example 9

In the same equipment place 2 mols of phenol, 1.67 mols of formaldehyde, in the form of 38% formalin solution, and 42.2 grams of the polythiol made according to Example 1. Catalyze the reaction by the addition of 0.6 gram of concentrated sulfuric acid dissolved in 20 cc. of water. Heat to reflux and hold for 1 hour. Without cooling, add the amount of calcium hydroxide dispersed in 5 cc. of water necessary to neutralize the sulfuric acid catalyst. The water layer should test neutral to litmus. Dehydrate under reduced pressure and with heat until a sample of the resin is brittle when removed from the reaction vessel and cooled.

The amount of dithiol that can be added is not limited to the approximately 20% amounts characteristic of the above examples. Much higher percentages can be used yielding products have a pronounced rubbery nature.

*Example 10*

Using the same type of equipment 2 mols of phenol, 2.2 mols of formaldehyde, in the form of 38% formalin solution, and 275 grams of dithiol prepared as in Example 2 are reacted together in the presence of 15 grams of 28% ammonium hydroxide as a catalyst. The reactants are refluxed for 40 minutes and then the resin is dehydrated by heating under a pressure of 15 to 30 mm. of mercury. In this case it is preferable to heat the resin for 6 hours on a steam bath after dehydration to carry the reaction further along.

We claim:

1. Process which comprises reacting phenol, formaldehyde and a polythiol having the formula $H(SCH_2CH_2OCH_2OCH_2CH_2S)_pH$ and a molecular weight of about 1200 to 5000, where $p$ is the degree of polymerization corresponding to said range of molecular weights, the phenol and formaldehyde being used in proportions, in relation to each other, sufficient to form a phenol formaldehyde resin and the polythiol being used in the proportion of about 5 to 70 per cent by weight of the sum total of the phenol, formaldehyde and polythiol.

2. The resinous reaction product of phenol, formaldehyde and a polythiol having a molecular weight of 1200 to 5000 and the formula $H(SCH_2CH_2OCH_2OCH_2CH_2S)_pH$ where $p$ indicates the degree of polymerization, said polythiol being used in the proportion of about 5–70% by weight of the sum total of the phenol, formaldehyde and polythiol, and the phenol and formaldehyde being used in proportions, in relation to each other, sufficient to form a phenol-formaldehyde resin.

JOSEPH C. PATRICK.
HARRY R. FERGUSON.

References Cited in the file of this patent

UNITED STATES PATENTS

| Number | Name | Date |
|---|---|---|
| 2,035,098 | Seaman | Mar. 24, 1936 |
| 2,195,380 | Patrick | Mar. 26, 1940 |
| 2,277,941 | Almy | Mar. 31, 1942 |
| 2,394,375 | Gross | Feb. 5, 1946 |

FOREIGN PATENTS

| Number | Country | Date |
|---|---|---|
| 420,386 | Great Britain | of 1934 |
| 935,415 | France | Feb. 2, 1948 |
| 48,977 | France | June 28, 1938 |
| | Addition to No. 804,552 | |

OTHER REFERENCES

Thiokol Liquid Polymer LP-3, pages 1 and 3, January 25, 1945, Thiokol Corp., Trenton, N. J.

Thiokol Liquid Polymer LP-2, page 16, October 13, 1947.